United States Patent [19]

Faber et al.

[11] Patent Number: 4,854,764
[45] Date of Patent: Aug. 8, 1989

[54] COUPLING DEVICE BETWEEN TWO ELEMENTS

[75] Inventors: Kurt H. A. E. Faber; Ute M. I. Faber, both of Sandviken; Knut Faber, Västerås; Inken A. H. Faber, Stockholm; Andrea J. Faber, Sandviken, all of Sweden

[73] Assignee: AB Sandvik Coromant, Sandviken, Sweden

[21] Appl. No.: 29,807

[22] Filed: Mar. 25, 1987

[30] Foreign Application Priority Data

Mar. 25, 1986 [SE] Sweden .................... 8601370
Nov. 26, 1986 [SE] Sweden .................... 8605062

[51] Int. Cl.⁴ .................. B25G 3/00; F16L 55/00
[52] U.S. Cl. ................................... 403/13; 403/326; 285/85; 285/308; 285/321; 285/27
[58] Field of Search ............ 285/321, 308, 82, 214, 285/83, 24, 84, 27, 85, 86, 421, 141; 403/326, 13

[56] References Cited

U.S. PATENT DOCUMENTS

| 633,037 | 9/1899 | Pfahler | 285/214 |
|---|---|---|---|
| 3,356,389 | 12/1967 | Fredd | 285/321 X |
| 3,405,956 | 10/1968 | Pierce | 285/321 X |
| 3,754,780 | 8/1973 | Pogonowski | 285/421 X |
| 4,610,465 | 9/1986 | Boyadjieff | 285/308 |

FOREIGN PATENT DOCUMENTS

| 1097465 | 7/1955 | France | 285/308 |
|---|---|---|---|
| 703686 | 1/1978 | U.S.S.R. | |
| 2136078 | 9/1984 | United Kingdom | |
| 2155133 | 9/1985 | United Kingdom | |

Primary Examiner—Dave W. Arola
Attorney, Agent, or Firm—Burns, Doane, Swecker & Mathis

[57] ABSTRACT

The invention relates to a releasable coupling between a male element and a female element. The coupling comprises a split clamp ring that is ranged to be received in corresponding annular recesses in the male element and female element, whereby the ring shall have one wedge surface to engage with a support surface in one recess on the male element and another wedge surface obliquely, disposed from the first wedge surface to engage with a support surface in the other recess in the female element. By applying a circumferentially directed force to the end portions of the split ring, it will be possible to achieve a locking engagement between the ring and its matching recesses, thus assembling the male and female elements to each other.

7 Claims, 10 Drawing Sheets

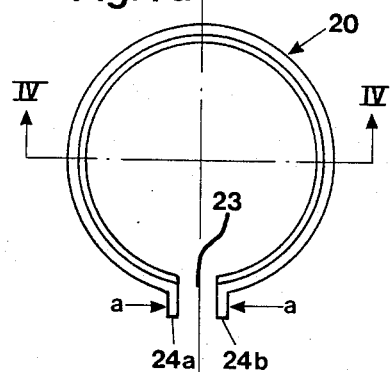
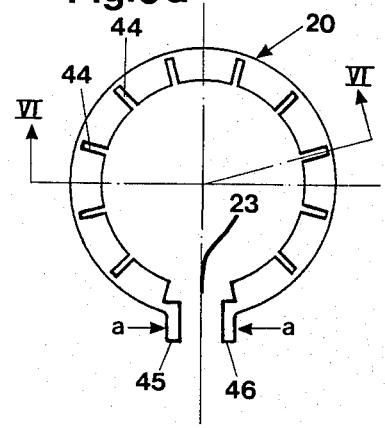
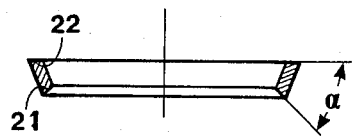
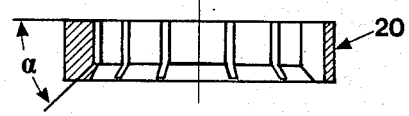
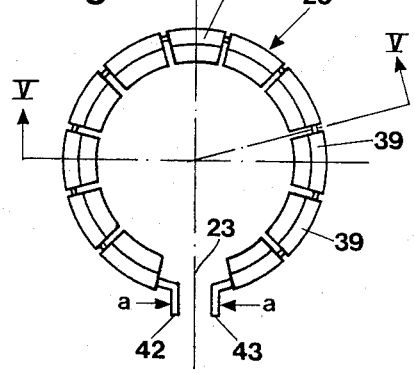
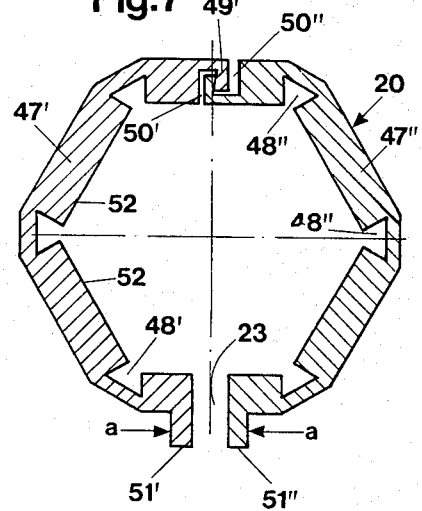
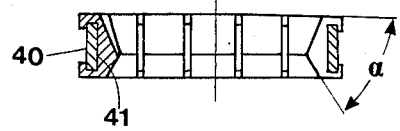

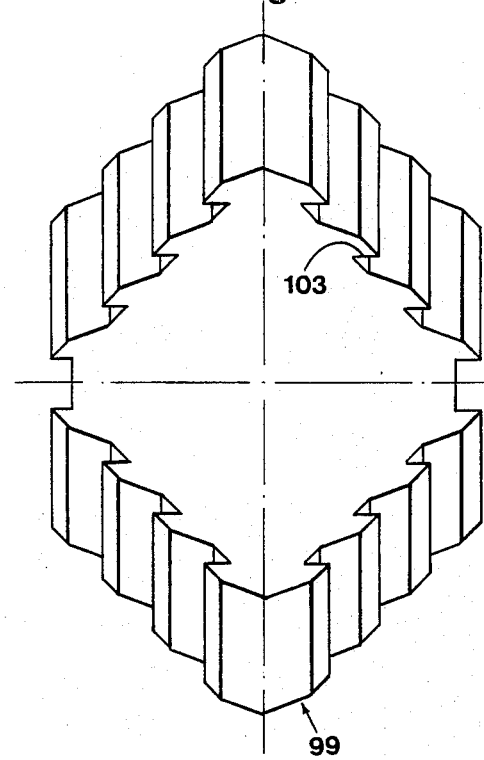
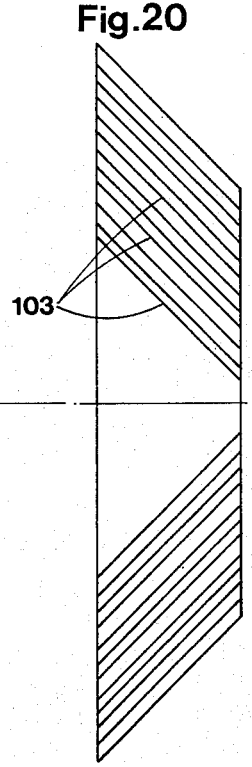
Fig.19  Fig.20
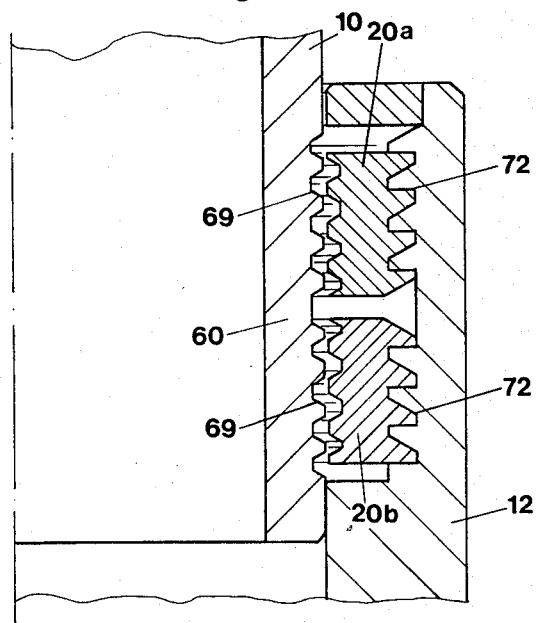
Fig.21

COUPLING DEVICE BETWEEN TWO ELEMENTS

BACKGROUND OF THE INVENTION

The present invention relates to a releasable coupling between two elements, such as two machine elements. More specifically the invention provides a coupling between two elements of cylindrical, conical or polygonal cross section in which an annular locking device is arranged to engage with corresponding annular grooves in said elements.

Machine elements are usually connected to each other by means of various locking devices. Rotating machine tools are usually connected to a conical arbor which is connected to the nose portion of the machine spindle by means of a chuck or any other coupling. A very large number of such various mounting devices are previously known and they are often specifically tailored for a special type of tools. In other applications, for instance when connecting two tube elements to each other, externally provided locking devices with annular flanges are often used where the final clamping force is achieved by some sort of threaded connection.

It is an object of the invention to provide an improved and simplified coupling device without restrictions as to accuracy and the clamping force that is attainable. The invention provides a simplified coupling device that can be made within small dimensional requirements and which enables good accessibility for its operation.

The foregoing objects are basically obtained by providing a coupling of the type initially referred to in which a single split locking ring with wedge shaped cross-section is received in an annular groove in one of the elements to be connected and by an applied external force on the end portion of the split locking ring is adapted to be expanded or compressed into engagement with a corresponding annular groove in the other element to be connected so that said first element is axially displaced towards said second element and towards a radial or conical abutment surface thus engaging and clamping said elements to each other.

THE DRAWINGS

The invention is described in detail in the following with reference to the accompanying drawings in which a number of embodiments are shown by way of example. It is to be understood that these embodiments are only illustrative of the invention and that various modifications thereof may be made within the scope of the claims.

In the drawings, FIG. 1 is a side elevational view in longitudinal section of an assembly, including a first flange provided tube element and a second element assembled via a split circular ring in accordance with the invention.

FIG. 4a is a top plan view and FIG. 4b a cross sectional view along the line IV—IV in FIG. 4a of a circular split locking ring.

FIG. 5a is a top plan view and FIG. 5b a cross sectional view along the line V—V in FIG. 5a of another circular split locking ring.

FIG. 6a is a top plan view and FIG. 5b a cross sectional view along the line VI—VI in FIG. 6a of another circular split lock ring.

FIG. 7 is a cross section of another embodiment of a split locking ring of polygonal shape.

FIG. 19 is side view of a wedge element to be used in engagement with a split locking ring as shown in FIGS. 9–10.

FIG. 20 is another side view of the wedge shown in FIG. 19.

FIG. 21 is a view in longitudinal section of a male part and a female part connected by means of two axially spaced split locking rings.

DESCRIPTION OF PREFERRED EMBODIMENT OF THE INVENTION

Figure 1:
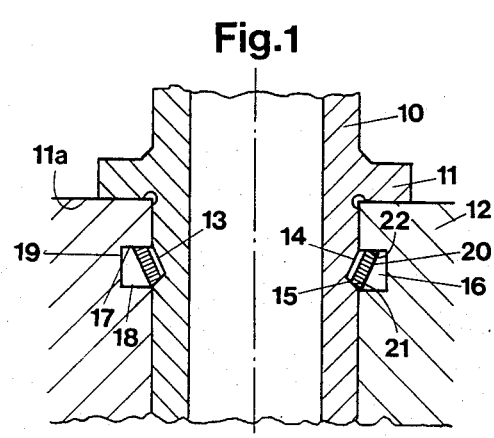

The embodiment of the invention shown in FIG. 1 includes a cylindrical male part 10 which is provided with a radial flange 11 adapted for abutment against a radial abutment surface 11a on a female part 12 with which said male part is to be connected. The male part 10 is tubular in shape and provided with an external annular groove 13 confined by two obliquely oriented end surfaces 14 and 15 whereby said female part 12 is provided with an internal square-angled annular groove 16 U-shaped in cross-section confined by two radially oriented end surfaces 17, 18 and an axially oriented surface 19. A circular split locking ring 20 wedge-shaped cross section defined by first and second wedge surfaces 21, 22. The first wedge surface 21 is arranged to engage against a correspondingly inclined surface 15 in the annular groove 13 and the second wedge surface 22 is arranged to engage with the radial surface 17 of the annular groove 16.

The split locking ring 20 received in said annular grooves 13 and 16 is of a design as shown in FIG. 4a and 4b. The locking ring 20 is trapezoidal in cross-section including the two opposed wedge surfaces 21 and 22 obliquely disposed at an angle α and an axial slot 23, whereby the end portions of the split ring 20 are in the form of two radially outwards oriented flanges 24 and 25. By applying an external circumferentially directed operative force a against these flanges 24a and 24b by means of suitable tools (not shown) a clamping force is exerted all around the locking ring 20, the size of which clamping force will be related to the operative force at a ratio 1:2 π. The exchange ratio will therefore amount to 1:6.28 without regard to the wedge angle α and the friction. By providing the locking ring 20 with two opposed wedge surfaces 21, 22 adapted to engage with complementary surfaces in said annular grooves 13, 16 the male part 10 will be axially displaced towards the female part 12 so that the flange 11 will come into contact with the surface 11a and thereby establish a locking connection between the locking ring 20 and said elements 10, 12 so that said elements 10, 12 are connected to each other.

Figure 2:
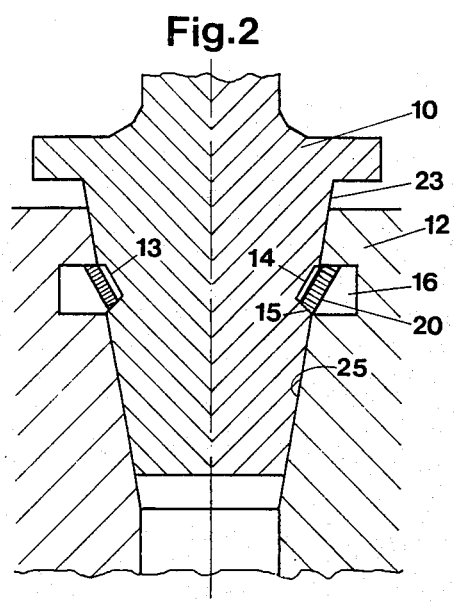
FIG. 2 is a view in longitudinal section similar to FIG. 1, but with a flange provided conical element assembled into a second element via a split circular ring.

In the embodiment shown in FIG. 2 the male part 10 is in the shape of a conical machine tool arbor having an external conical surface 23 to engage with a corresponding concial bore 25 in the other part 12, in this case a machine spindle. The tool arbor 10 is arranged to be equipped with a tool in the end portion which is opposed to the portion having said bore 25. The shape of the locking ring 20 and said grooves 13, 16 is the same as in FIG. 1. The locking function is achieved by axially displacing said element 10 into said conical bore 25.

Figure 3:
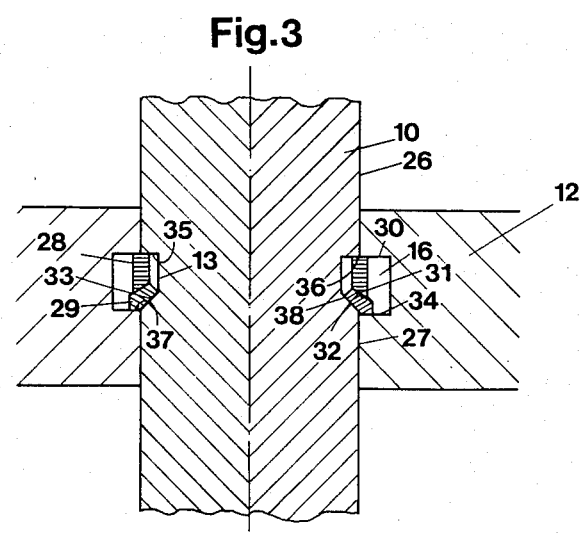
FIG. 3 is a view in longitudinal section similar to FIG. 1, but with a solid cylindrical element assembled into a second element via a circular lock ring.

In the embodiment shown in FIG. 3 the male part 10 is in the shape of a solid cylindrical bar the external surface 26 of which is arranged to be inserted with a close fit into a complementary cylindrical bore 27 in the part 12 so that the annular groove 13 on the part 10 and the groove on the part 12 are located directly opposite each other. The locking ring is, in this case, constituted by two separate rings including a clamping ring 28 and a support ring 29. In its inactive position, i.e. before applying the operative force on the locking ring, this two-piece ring is located in the U-shaped groove 16 but after insertion of said male part 10 into the bore 27 so that said grooves are positioned opposite each other. The clamp ring 28 is activated by suitable means (not shown) so it becomes compressed radially inwards into the groove 13. By activating the clamp ring 28 the support ring 29 will also be compressed radially inwards due to the orientation of obliquely disposed surfaces 31 and 32 on said clamp ring 28 and said support ring 29, respectively. The locking function is achieved due to the fact that when said rings 28, 29 are compressed radially inwards a portion of the radial surface 36 of the clamp ring 28 will be brought in contact with the radial abutment surface 35 of the annular groove 13 in said male part 10. At the same time the wedge surface 33 of the support ring 29 will engage with the concial surface 38 of the annular groove 13 and the radial surface 37 of the support ring 29 will maintain its engagement with the radial surface 34 in the annular groove 16 while a portion of the radial surface 36 of clamp ring 28 will maintain its engagement with the radial surface 30 in the annular groove 16 thereby establishing an effective locking engagement between male and female parts 10 and 12 respectively.

In FIG. 5a and 5b an alternative embodiment of the split locking ring according to the invention is shown. In this case the ring 20 is composed of a number of separate wedge shaped segments 39 held together in a ring by means of a metal band 40 which is received in a complementary groove 41 in each segment 39 and the end portions 42, 43 of which are provided in the shape of two radially outwards oriented flanges which will enable applying necessary clamp force a in a circumferential direction by means of a tool (not shown). Instead of using such metal clamp band it would also be possible to use one or several clamp wires.

In FIGS. 6a and 6b there is shown an alternative embodiment where the locking ring 20 is provided with a number of radial slots 44. In similarity with the embodiment of FIG. 4 the ring 20 has an axial slot 23 whereby both end portions of said ring are in the shape of two radially outwards extending flanges 45 and 46 which enable applying a necessary clamp force a thereon. Although the slots 44 are evenly distributed around the circumference the mutual distances between said slots 44 could vary whereby the size and the shape could be chosen depending upon the desired elasticity of said ring 20. Hence, it is fully possible to have an uneven distribution of said slots 44 around the circumference of said ring.

In the embodiment of the locking ring shown in FIG. 7 the ring is composed of two similar semicircular portions 47' and 47" where each such portion is provided with a number of radially oriented slots 48 with dovetail shape in cross-section. Each such semicircular ring portion 47 is at one end provided with a radially inwards extending flange 49' for engagement with a corresponding recess 50" in the second semicircular ring portion. In the other end of said semicircular ring portion 47' it is provided with a radially outwards extending flange 51' to enable applying an external force a thereon to achieve compression or expansion of said locking ring 20. Further, the interior surface 52 of each said semicircular ring portion is plane in shape so that these plane surfaces together define a polygonal cross section. It is of course possible to have this locking ring composed of more than two similarly interconnected ring portions.

Figure 8A:
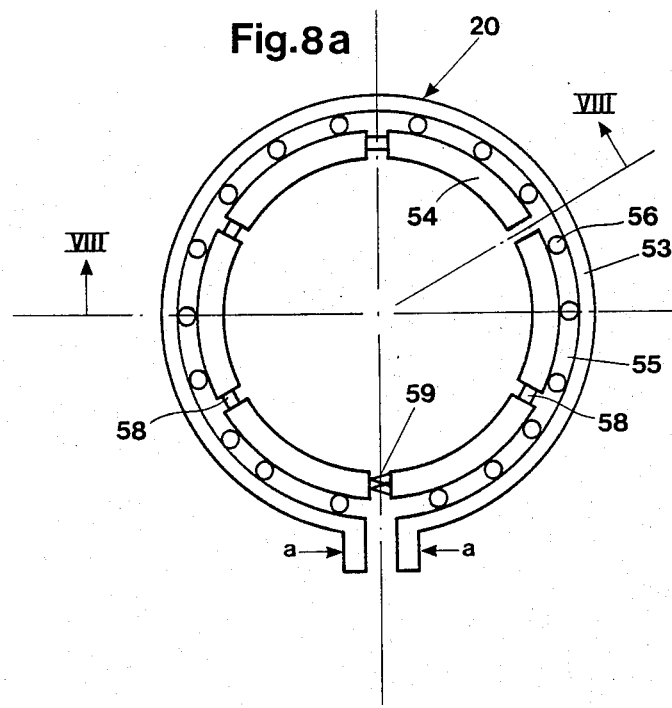
FIG. 8a is a top plan view and FIG. 8b is a cross sectional view along the line VIII-13 VIII in FIG. 8a of another embodiment of a circular locking ring.
Figure 8B:
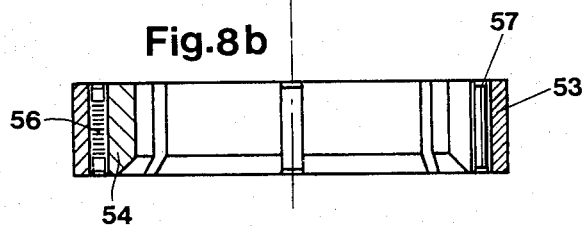

In FIGS. 8a and 8b there is shown an alternative embodiment of the locking ring 20, in this case composed of two ring portions whereby the outer ring is a clamp ring 53 whereas the inner ring is composed of a number of wedge-shaped segments 54. There is an annular space 55 between said outer ring and said inner ring in which a number of cylindrical rollers 56 are mutually spaced circumferentially. Instead of rollers it would be possible to use balls. These mentioned rollers 56 are in conventional manner located in cylindrical bearing holders 57. The segments 54 are suitably connected by vulcanization of rubber or plastic material portions 58. In addition thereto a spring element 59 is located between two segments such that said segments 54 become subjected to a radially prestressed condition towards the outer clamp ring. Due to this arrangement the frictional impact on the locking system has been essentially reduced.

As related in the foregoing, the external force a can be applied to the end portions of the locking ring 20 due to its radially provided flanges that are engageable with a tool. Both said locking ring end portions could alternatively be provided with recesses extending essentially in the tangential direction in which a screw is threadably engaged by means of which the locking ring can be expanded or compressed.

The above related type of coupling device will enable usage of relatively large surfaces for the transmission of clamping forces. At the same time, this coupling makes it possible to achieve a high exchange or transmission ratio between the applied operative force and the resulting clamping force, more specifically a ratio of 1:6.28 without having regard to the friction and the wedge angle. This coupling system will also be less susceptible to elastic deformation due to the fact that the clamping force is applied all over the circumference. Further, this simple locking ring will enable achieving small dimensions and reduced manufacturing costs specifically regarding the clamped part. It is also essential that the portion located around the center line is unaffected and with a large opening can be used for other purposes.

Figure 9:
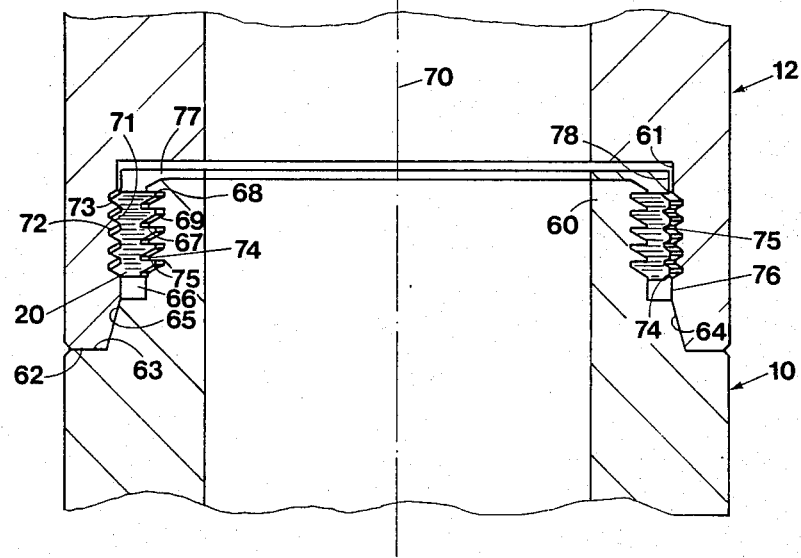
FIG. 9 is a view in longitudinal section of a male part and a female part connected by means of a circular split locking ring in accordance with another embodiment of the invention.
Figure 10:
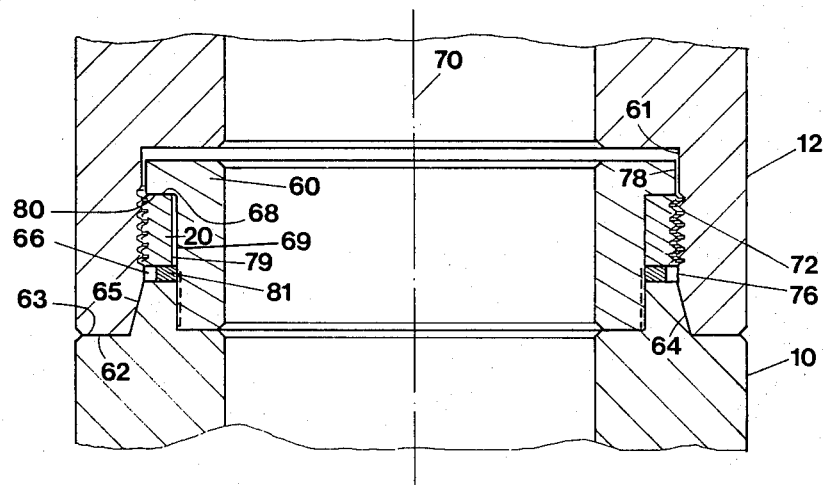
FIG. 10 is a view in longitudinal section similar to FIG. 9 of another embodiment of the invention.
Figure 11:
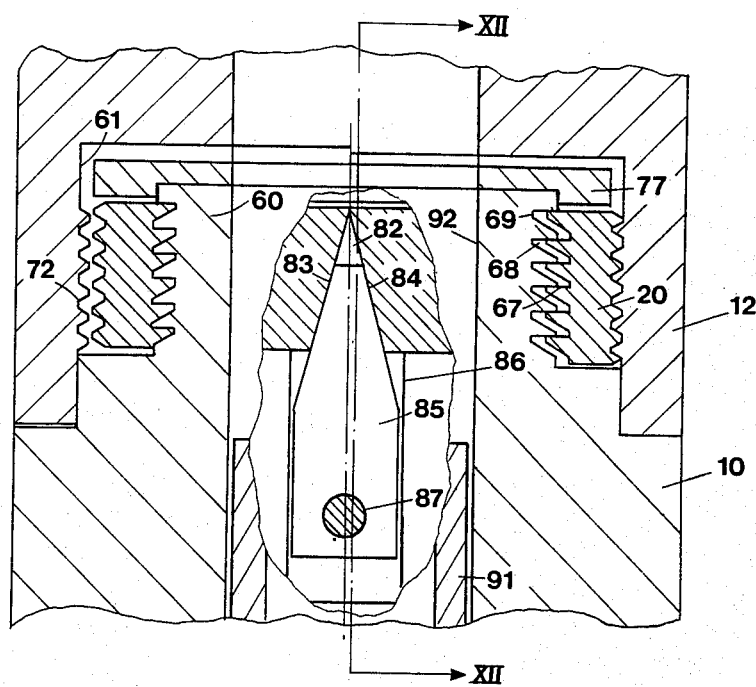
FIG. 11 is a view in longitudinal section taken along the line XI—XI in FIG. 12 of an alternative embodiment.

In FIG. 9 there is shown another embodiment in which the male part 10 is to be assembled with a female part 12. The male part 10 is provided with an axially protruding pin member 60 and the female part 12 has a corresponding cylindrical recess 61. This pin member 60 can either be made integral with the male part 10 as shown in FIG. 9 or it can be made as a separate part releasably connected with the male part by thread or other connection as shown in FIG. 10. The male part 10 has a radially inwards extending abutment surface 62 against which a corresponding end surface 63 of the female part 12 is intended to be axially supported. The surface 62 is located next to an inner conical surface 64 on the male part 10 (see FIG. 9) with which a corresponding conical surface 65 of the female part 12 is intended to engage in order to reach a good centering. The outer diameter of the pin member 60 and the diameter of recess 61 are so mutually adapted that an annular space 66 is obtained therebetween in which a split clamp ring 20 of a suitable spring steel material is received while located on the male part 10. The clamp ring 20 is interiorly provided with several axially spaced wedge surfaces 67 adapted to act as abutment flanges which engage complementary radial support surfaces 68 in a corresponding number of axially separated annular grooves 69 on the male part 10. The split clamp ring 20 is exteriorly provided with a similar profile. Those inner wedge surfaces 67 intended to act as abutment flanges as shown in FIGS. 9-11 are radially oriented but they can alternatively be obliquely disposed in relation to the center line 70 of the male part 10.

The wedge surfaces 71 provided exteriorly on the clamp ring 20 are obliquely disposed in relation to the center line 70 and intended to engage in correspondingly V-shaped annular grooves 72 on the female part 12. The wedge surfaces 67 provided on the inner surface of the clamp ring 20 are radially oriented but are obliquely disposed in relation to the exteriorly provided wedge surfaces 71 of the clamp ring which are intended to engage with complementary support surfaces 73 in said annular grooves 72.

When interconnecting the male and female parts the split clamp ring 20 will, by applying an external force tangentially i.e., circumferentially to the end portions of said ring, be expanded to a position in which its external wedge surfaces 71 are brought into engagement with complementary support surfaces 73 in annular grooves 72 while the inner wedge surfaces 67 maintain their surface contact with their complementary support surfaces 68. Before applying this force to the clamp ring 20 the latter is in the position illustrated on the right side of center line 70 in FIG. 9-10 in order to enable said male and female parts 10, 12 to be assembled. Upon expansion of the ring, the wedge surfaces 67 will slide radially outwards while maintaining surface contact with support surfaces 68, as illustrated to the left side of center line 70 in FIGS. 9 and 10.

In order to be able to have said male and female parts unproblematically brought into engagement which means inserting pin member 60 into recess 61 without interference occurring between outer end surfaces 74 of said clamp ring 20 and the peak surfaces 75 between grooves 72 on the female part 12, the latter is provided with a guide surface 76 having a somewhat larger diameter than that of end surfaces 74 while the diameter being somewhat less than that of end surfaces 75 of the female part 12. The male part 10 is at its front end provided with a guide ring 77 having a guiding surface 78 acting in the same manner as guiding surface 76. The axial extension of said guiding surfaces 76 and 78 should be somewhat larger than the distance between two adjacent annular recesses 72.

As shown in FIG. 9 annular recesses 69 are in the shape of axially separated concentric recesses. Thus, the radially inwardly facing wall of the ring has a set of longitudinally spaced teeth received in longitudinally spaced grooves 69 of the male part 10, and the radially outwardly facing wall of the ring has a set of longitudinally spaced teeth received in longitudinally spaced grooves 72 of the female part 12. The same is true of FIGS. 11, 12 and 13. It is alternatively possible to have said recesses arranged in thread form with a certain pitch. An alternative embodiment is shown in FIG. 10 where the clamp ring 20 is provided with a flat interior surface 79. The position of the clamp ring in a non-clamped position is shown to the right of center line 70 while the clamp ring in its clamped position is shown to the left of said center line 70. The inner wedge surface of the clamp ring 20 will in this case be the same as the radial inner end surface 80 of said clamp ring which is to be brought into surface contact with the radially oriented support surface 68 of the annular recess 69. As is shown in FIG. 10 the annular recess 69 is in the shape of a U-shaped recess provided on the mantle surface of the pin member 60 where the rear radial guiding surface is formed by a guiding ring 81 which, together with the axially foremost located guiding ring 77 forms the axial confining surfaces of said recess 69.

The clamp ring 20 can in its inactive position be located in annular recesses 69 on the mantle surface of the male part whereby it must be activated so as to expand into engagement with complementary wedge surfaces in mating annular recesses in the female part 12. Alternatively the clamp ring 20 can in its inactivated position be located in annular recesses in the female part and then be subjected to compression so as to establish a locking engagement with mating recesses in the male part. In certain applications it can, however, be sufficient if the clamp ring in FIG. 9, before being activated, has a larger diameter on its end surfaces than correspoding profile of the female part. In such a case the end portion of the clamp ring must be activated by external forces at the engagement or disengagement of said male and female parts 10 and 12, for instance by using a wedge, an excenter, gripping means or other means whereby the locking function between said parts 10 and 12 is solely established by the elasticity or the expanding or compressive forces exerted by the clamp ring itself.

Figure 12:
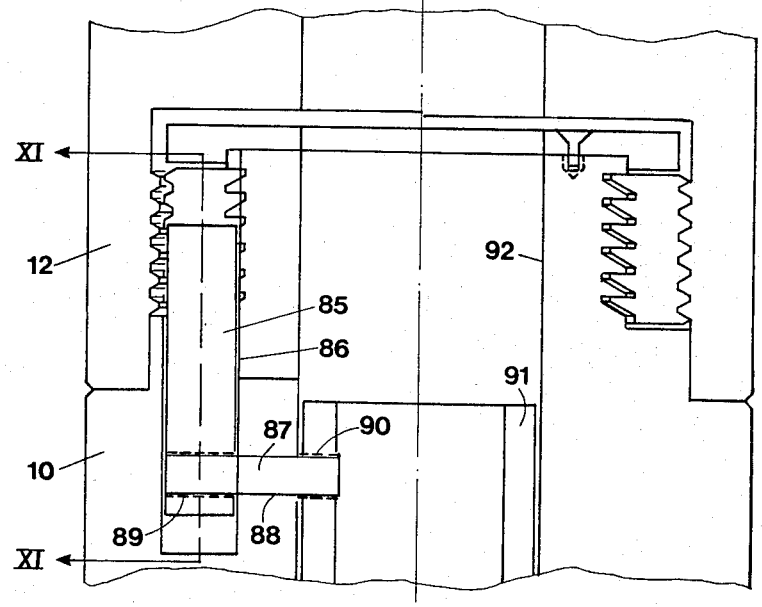
FIG. 12 is a view in longitudinal section taken along the line XII—XII in FIG. 11.

In FIGS. 11-12 is shown an alternative embodiment of the invention where the clamp ring 20 is located on the mantle surface of the male part 10. The clamp ring 20 is provided with a wedge formed slot 82 which is confined by two converging wedge surfaces 83 and 84 defined by end walls which create the split region of the ring. A wedge element 85 is located in a recess 86 in the male part 10 and partially received in said slot 82 whereby the portion of said wedge 85 that extends into said slot 82 is provided with contact surfaces that are complementary with said wedge surfaces 83 and 84.

In order to enable axial displacement of the wedge 85 a cylindrical element 87 is received in a radially oriented bore 88 in the male part 10 whereby the radially outer end portion is received in a complementary bore 89 in said wedge 85 and the opposite end portion of said cylindrical element 87 is received in a corresponding radially oriented bore 90 in a sleeve 91 that is received in a central cylindrical bore 92 in the male part 10. By applying an axial force on the sleeve 91 upwards (FIGS. 11-12) it is possible to exert, via said cylindrical element 87, a corresponding axial force upwards onto the wedge 85 so that the latter is extended into the slot 82 and thereby will forcefully bring the clamp ring 20 to expand into locking engagement with wedge surfaces in annular recesses 72 provided in the female part 12.

Figure 13:
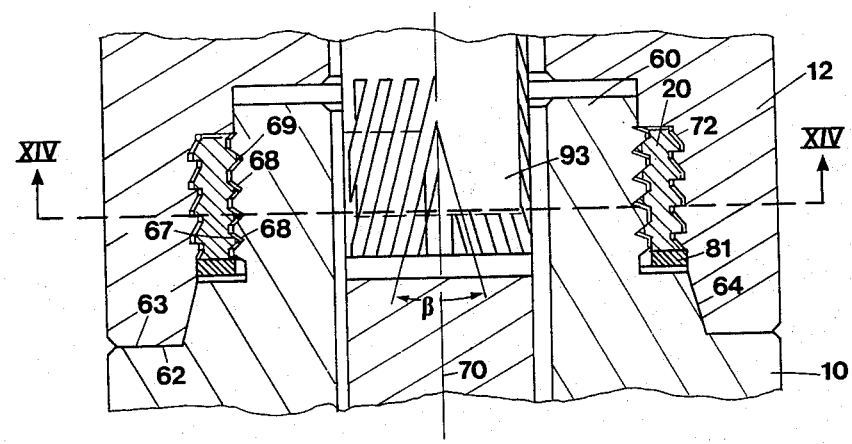
FIG. 13 is a view in longitudinal section along the line XIII—XIII in FIG. 14 of an alternative embodiment.
Figure 14:
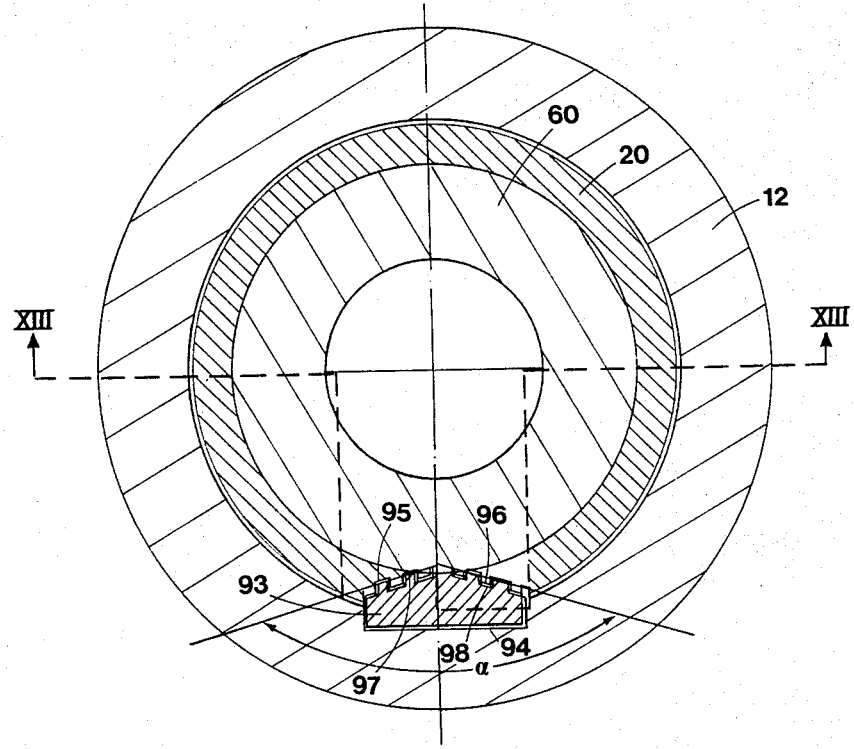
FIG. 14 is a view in cross section along the line XIV—XIV in FIG. 13.
Figure 15:
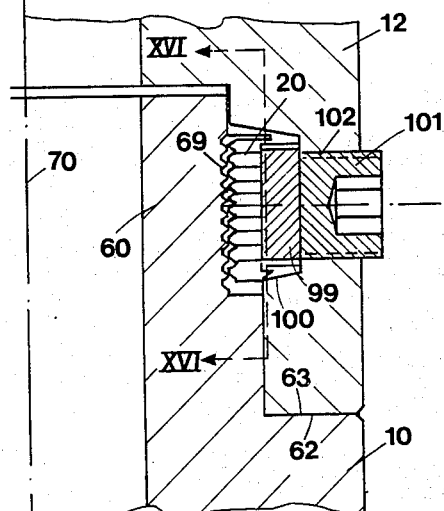
FIG. 15 is a partial view in longitudinal section of a male part and a female part connected by a split locking ring of the invention.
Figure 16:
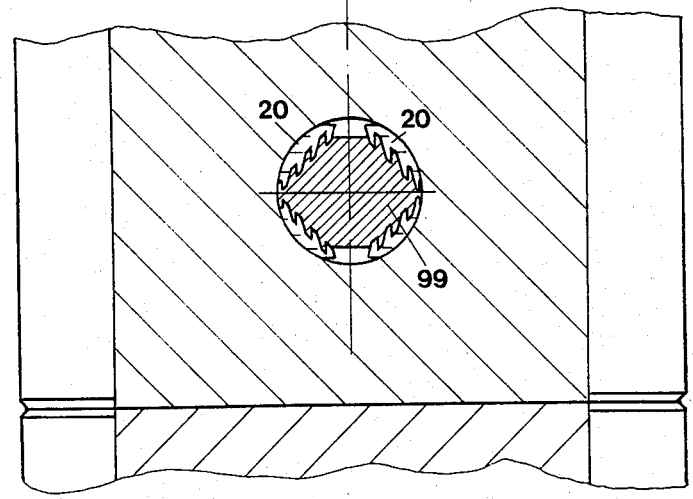
FIG. 16 is a sectional view taken along the line XVI—XVI in FIG. 15.

FIGS. 13-14 depict an alternative embodiment of the invention in which both the clamp ring 20 and an associated wedge element 93 are received in the female part 12. In similarity with the embodiment in FIG. 10 the pin member 60 is provided with a guide ring 81 arranged to provide axial support and to hold the clamp ring 20 securely in its position axially. The wedge 93 is received in an axially oriented groove 94 that is U-shaped in cross-section. The clamp ring 20 is slotted axially in such a way that its end surfaces 95 and 96 appear with a square-angled tooth profile that provide useful wedge surfaces. These end surfaces 95, 96 are obliquely disposed from each other at an angle α in the range of 120-160°. At the same time these toothed wedge surfaces 95, 96 are symmetrically converging at an angle β, in the range of 15-45°. The end faces 97 and 98 of the wedge 93 are similarly obliquely disposed at an angle α while having a tooth profile similar to that of said end surfaces 95, 96 of the slotted clamp ring 20.

By applying an axial force on the wedge 95 downwards in FIG. 13 it is possible to exert a radial compression to the clamp ring 20 so that the wedge surfaces 67 of the latter engages with corresponding support surfaces 68 in annular recesses 69 on the pin member 60 of the male part 10, thus establishing a locking connection between the male part 10 and the female part 12.

Figure 17:
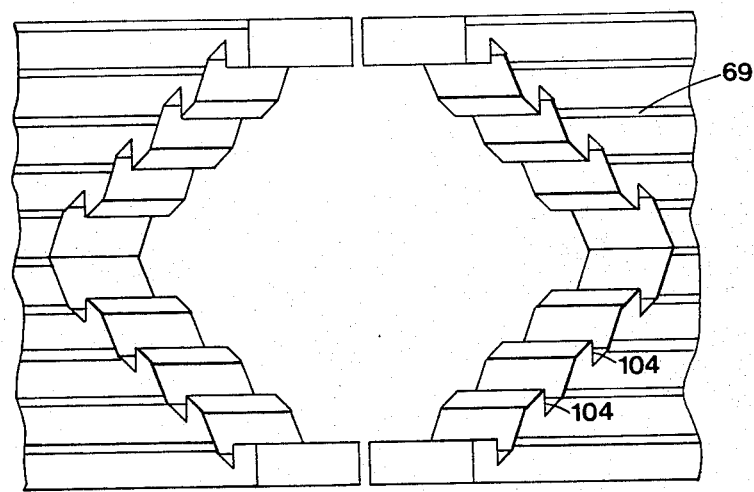
FIG. 17 is a partial side view, ring of the invention viewed from the interior of a split locking ring of the invention.
Figure 18:
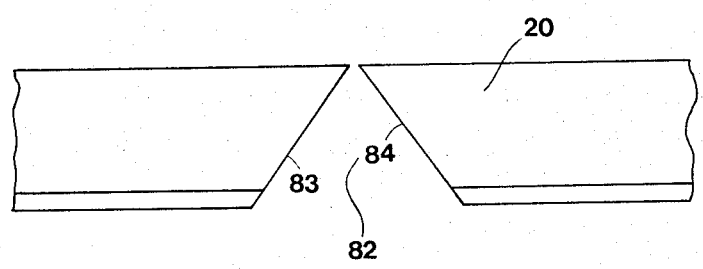
FIG. 18 is a partial side view of the locking ring in FIG. 17.

FIGS. 15-18 depict another alternative embodiment of the invention in which the clamp ring 20 is intended to be subjected to radial compression inwards so as to engage with annular recesses 69 on the mantle surface of the pin member 60. The force exerted to the clamp ring 20 is applied by a clamping wedge 99 substantially rhombic in cross-section which is received in a radial groove 100. The radial force exerted on the wedge 99 is applied by a clamp screw 101 that is located in a cylindrical bore 102 oriented coaxially in relation to the groove 100. The mantle surface of the wedge 99 is provided with obliquely disposed wedge surfaces 103 which correspond in shape with the shape of the end surfaces of the slotted clamp ring 20. The shape of the clamp ring 20 is further illustrated in FIGS. 17-18, wherein the active wedge surfaces thereof are designated 104. In FIG. 17 the clamp ring 20 which has a wedge-formed slot 82 is illustrated from its interior but viewed outwards towards the end surfaces 83 and 84 confining said slot 82. In this view the annular recesses 69 provided on the male part 10 are also visible.

FIGS. 19-20 illustrate an embodiment of a wedge element 99 designed to engagingly cooperate with the clamp ring 20 whereby the active wedge surfaces have been given designation numbers 103.

FIG. 21 illustrates another embodiment of the invention in which the claim ring consists of two separate ring members 20a and 20b, which in their inactive positions, are located in corresponding annular recesses 72 in the female part 12. Ring member 20a is located in the upper portion of said annular recess 72 whereas ring member 20b is located in the lower portion of said recess 72 in the female part 12. By exerting a compressive force to said ring members 20a and 20b these can be subjected to compression such as to engage with upper and lower portions, respectively, of the annular recess 69 provided on the pin member 60 of the male part 10, whereby all axial forces will be carried by the active wedge surfaces on the exterior and interior surfaces of said clamp ring members.

Figure 22:
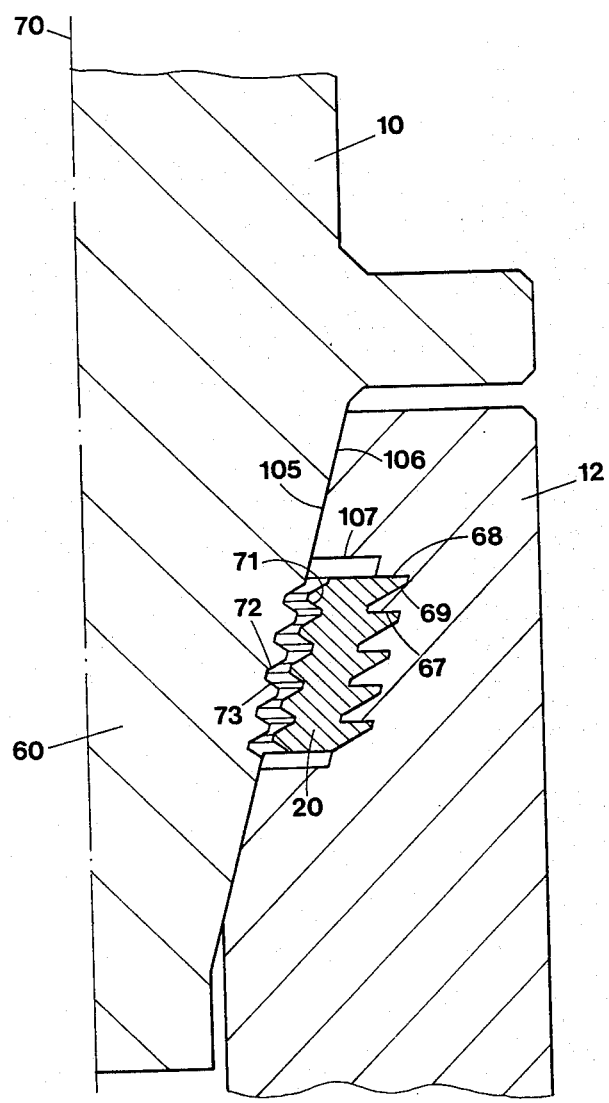
FIG. 22 is a partial view in longitudinal section of a conical male part and a complementary female part connected by means of a circular split locking ring.

FIG. 22 depicts a further another alternative embodiment of the invention in which the pin member 60 of the male part 10 has a conical mantle surface 105, and the female part 12 has a corresponding conical surface 106. The clamp ring 20 is in its inactive position located in a recess 107 in the female part 12 whereby the wedge surfaces 67 of the clamp ring are engaging with corresponding radially oriented support surfaces 68 in annular recesses 69 provided in the inner wall portion of the recess 107. By exerting a force directed radially inwards, the clamp ring 20 is subjected to compression so as to bring its axially separated wedge surfaces 71 into engagement with corresponding obliquely disposed support surfaces 73 in annular recesses 72 so that an axial locking engagement occurs between male and female parts 10 and 12, respectively.

We claim:

1. In combination, first and second elements, and means coupling said first and second elements together:
    said first element comprising an external circumferential surface containing a radially outwardly open generally circumferential groove,
    said second element comprising an internal circumferential surface sized to receive said external surface, said internal surface containing a radially inwardly open generally circumferential groove opposing said outwardly open groove,
    one of said grooves including a first end surface extending substantially perpendicularly relative to a longitudinal axis defined by said internal and external surfaces, the other of said grooves including a second end surface oriented at an acute angle relative to said longitudinal axis and spaced longitudinally from said first end surface,
    a split ring member disposed partially in said first groove and partially in said second groove, said ring member including a split region defined by mutually opposing end walls, wherein relative movement of said end walls in a circumferential direction is opposed by an elastic bias of said ring, said ring member having a wedge-shaped cross-section formed by first and second locking surfaces, said first locking surface disposed parallel to, and in engagement with, said first end surface, said second locking surface disposed parallel to, and in engagement with, said second end surface, and actuator means for applying circumferentially directed forces to said ends of said ring member in a manner deforming said ring member in a radial direction, against said elastic bias, for maintaining engagement between said first end surface and said first locking surface and between said second end surface and said second locking surface for preventing withdrawal of said first element from said second element.

2. Apparatus according to claim 1, wherein said internal and external circumferential surfaces are of cylindrical configuration.

3. Apparatus according to claim 1, wherein said end walls of said ring member comprise a pair of circumferentially opposed wedge surfaces, said actuator means comprising a wedge member movable longitudinally between said wedge surfaces for exerting circumferentially directed forces on said split region of said ring member for radially expanding said ring member.

4. Apparatus according to claim 3, wherein said first and second elements contain mutually abutting radially extending surfaces for limiting the extent of longitudinal movement of said first element into said second element.

5. Apparatus according to claim 1 including an annular guide ring mounted on a front longitudinal end of said first element, said guide ring extending radially beyond said external circumferential surface by a distance greater than said ring member when the latter is in a radially compressed state to guide said first member into said second element.

6. Apparatus according to claim 1, wherein said split ring comprises a radially inwardly facing wall and a radially outwardly facing wall, one of said radially facing walls including a plurality of said first locking surfaces spaced apart in the longitudinal direction to form a first set of circumferentially extending, longitudinally spaced teeth, the other of said radially facing walls including a plurality of said second locking surfaces spaced apart in said longitudinal direction to form a second set of circumferentially extending, longitudinally spaced teeth, one of said first and second elements containing a plurality of said grooves spaced apart longitudinally and receiving respective ones of said first set of teeth, the other of said first and second elements containing a plurality of said grooves spaced apart longitudinally and receiving respective ones of said second set of teeth.

7. Apparatus according to claim 1, wherein said actuator means applies said forces to said ends of said ring member in a manner deforming said ring member in a radially outward direction.

* * * * *